United States Patent
Nishi et al.

[11] Patent Number: 6,144,940
[45] Date of Patent: Nov. 7, 2000

[54] APPARATUS FOR ACCEPTING REQUEST OF PROCESSING THROUGH SPEECH AND ITS ACCEPTING METHOD

[75] Inventors: Keizo Nishi, Hirakata; Muneichi Tsujibayashi, Izumi, both of Japan

[73] Assignee: The Senshu Bank, Ltd., Osaka, Japan

[21] Appl. No.: 09/029,908

[22] PCT Filed: Jul. 9, 1997

[86] PCT No.: PCT/JP97/02394

§ 371 Date: Jul. 6, 1998

§ 102(e) Date: Jul. 6, 1998

[87] PCT Pub. No.: WO98/02795

PCT Pub. Date: Jan. 22, 1998

[30] Foreign Application Priority Data

Jul. 12, 1996 [JP] Japan ................................. 8-183055
May 23, 1997 [JP] Japan ................................. 9-133522

[51] Int. Cl.[7] ................................................ G10L 21/06
[52] U.S. Cl. ........................... 704/270; 704/235; 704/275
[58] Field of Search ................................. 704/270, 272, 704/275, 235

[56] References Cited

U.S. PATENT DOCUMENTS

| | | | |
|---|---|---|---|
| 5,051,924 | 9/1991 | Bergeron et al. | 704/200 |
| 5,125,024 | 6/1992 | Gokcen et al. | 704/270 |
| 5,345,501 | 9/1994 | Shelton | 704/270 |
| 5,724,481 | 3/1998 | Garberg et al. | 704/243 |
| 5,806,040 | 9/1998 | Vensko | 704/273 |
| 5,809,464 | 9/1998 | Kopp et al. | 704/235 |
| 5,845,246 | 12/1998 | Schalk | 704/243 |
| 5,860,059 | 9/1999 | Aust et al. | 704/231 |
| 5,920,835 | 7/1999 | Huzenlaub et al. | 704/235 |

*Primary Examiner*—David R. Hudspeth
*Assistant Examiner*—Daniel Abebe
*Attorney, Agent, or Firm*—Townsend and Townsend and Crew LLP

[57] ABSTRACT

The present invention relates to an apparatus for and a method of receiving requests, by speech such as by telephone, for a variety of processing such as for a bank transaction, purchase of a commodity. So far, there has existed none that allows construction of a data base of the requester's processing request contents and agreement contents which is readily accessible from an existing computer system. As this invention comprises: speech signal quantizing means (11) for quantizing a first predetermined portion of conversation of a processing requester at the time of a processing request, thus converting it into digital speech data; speech signal/character string converting means (12) for converting a second predetermined portion of speech data of the conversation into character string data; and storing means (13) for storing said digital speech data and said character string data as separate files or as a single combined file in such a manner that said files/file relating to said processing request may be distinguished from those relating to other processing requests; then, it is possible to construct a data base of the requester's processing request contents and agreement contents which is readily accessible from an existing computer system, even if the processing request is received by means of speech.

5 Claims, 3 Drawing Sheets

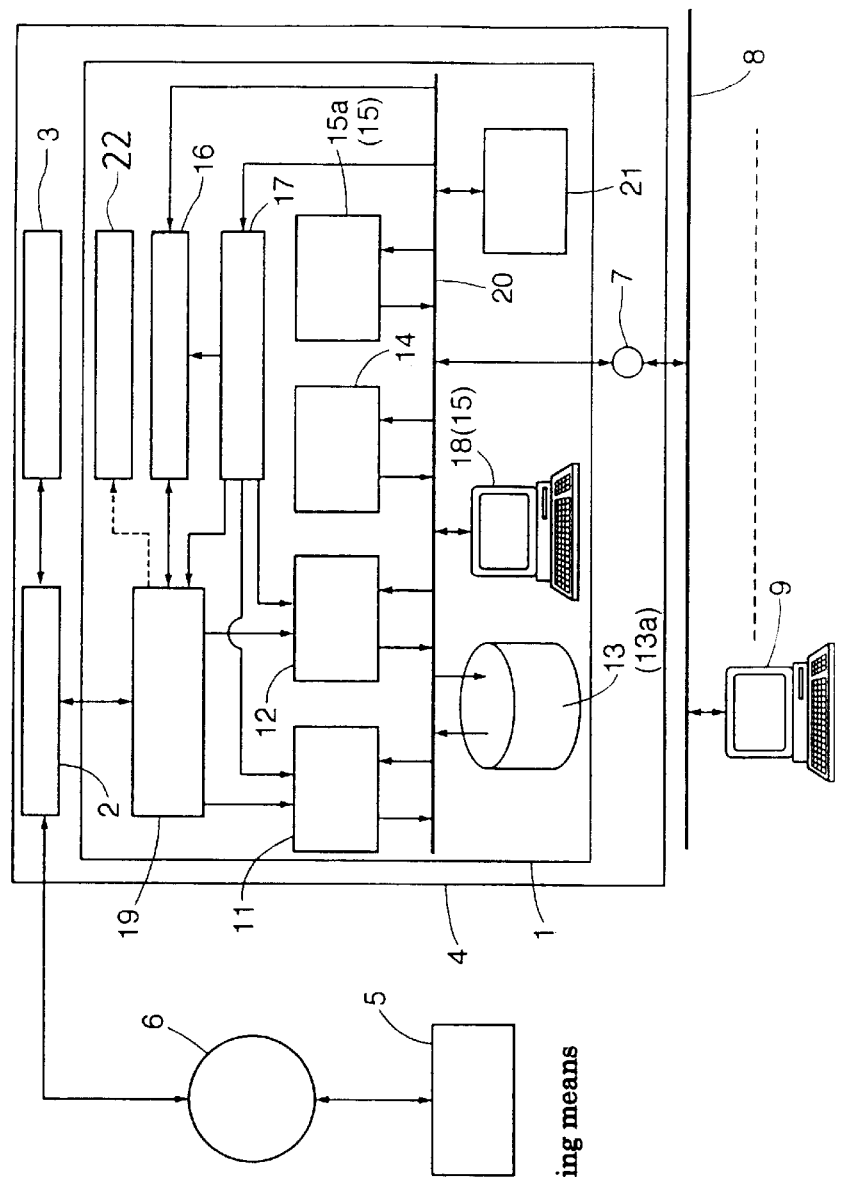

FIG. 1.

2  PBX
3  operator terminal
5  client (processing requester)
6  public telephone network
11  speech signal quantizing means
12  speech signal/character string converting means
13  storage means
14  speech waveform generating means
15a  voucher making means
16  automatic speech responding means
17  time data generating means
19  speech signal transmitter receiver
21  CPU
22  sound recording means

6,144,940

APPARATUS FOR ACCEPTING REQUEST OF PROCESSING THROUGH SPEECH AND ITS ACCEPTING METHOD

TECHNICAL FIELD

The present invention relates to an apparatus for and a method of receiving requests, by speech such as by telephone, for a variety of processing such as for a bank transaction, purchase of a commodity.

BACKGROUND ART

Conventionally, when receiving various processing requests for a bank transaction, a commodity purchase or the like, an operator such as a respondent to a telephone call, would hear the contents of the processing request, make a processing voucher in the form of a printed paper slip, execute the processing contents based on the processing voucher and store the processing voucher after the execution of the processing in preparation for contingency in the future. Further, in the case of a bank transaction, in addition to the storage of the processing voucher in the form of a printed paper slip, a magnetic tape or the like would also be stored which records in the analog the contents of the conversation that took place between the requester and the operator at the time of the receipt of the processing request by speech such as by a telephone call.

However, with the processing voucher prepared by printing on the paper slip the contents heard by the operator, there is the risk that the processing voucher may be made with an error due to mishearing by the operator and/or misunderstanding by the requester. In order to avoid this, the operator would repeat the contents of the processing request for confirmation by the requester. However, the requester's approval by means of speech is fugitive in nature which lacks the provability of agreement by means of e.g. a signature or a signature stamp which verifies the requester's identity. Hence, it is insufficient as a record of proof.

For this reason, as described above, in the case of a bank transaction, in addition to storage of the processing voucher, they would store also e.g. a magnetic tape which records the entire contents of the conversation between the requester and the operator. However, this magnetic tape or the like presents difficulty in direct access thereto from a computer system used in the bank transaction and presents also a problem in the data reliability against long-term storage. In addition, as they are analog data, the data tends to be bulky, hence presenting difficulty in securing a storage place therefor. In these ways, the various problems have existed in the respect of handing.

An object of the present invention is to solve the above-described problems of the conventional art by providing an apparatus for and a method of receiving processing requests which apparatus and method allow production of data base of contents of processing requests and agreements by their requesters that can be readily accessed from an existing computer system.

DISCLOSURE OF THE INVENTION

The above-noted object is achieved by the invention set forth in the claims.

First, a processing request receiving apparatus, according to the characterizing features of the present invention, comprises:

speech signal quantizing means for quantizing a first predetermined portion of conversation of a processing requester at the time of a processing request, thus converting it into digital speech data;

speech signal/character string converting means for converting a second predetermined portion of speech data of the conversation into character string data; and storing means for storing said digital speech data and said character string data as separate files or as a single combined file in such a manner that said files/file relating to said processing request may be distinguished from those relating to other processing requests.

Further, a method of receiving a processing request, according to the characterizing features of the invention, comprises the steps of:

receiving the processing request from a processing requester;

then, executing a data storage area making step for making a processing request data storage area in a predetermined region of a storing means with the processing request being distinguishable from other processing requests;

executing receiving steps of receiving the contents of conversation of the processing requester with dividing the contents into predetermined content portions;

executing a speech signal quantizing step for quantizing speech signals of the conversation contents, thus converting them into digital speech data if the conversation contents received at each said receiving step belongs within a predetermined first conversation content class;

executing a speech signal character string converting step for generating character string data of speech data based on the speech data of the conversation contents if the conversation content belongs within a predetermined second conversation content class; and for all of the divided conversation content portions, executing a storing step of storing the digital speech data or the character string data in the data storage area either separately upon completion of said each speech signal quantizing step or said each speech signal/character string converting step or in batch upon completion of all of the speech signal quantizing steps and the speech signal/character string data converting steps.

With the above, portions of the contents of the processing request by voice or speech from the processing requester which portions the requestee needs to process and store, for instance, a transaction item, the name of the processing requester or titular proprietor, a name or serial number of the branch, an account name, and a processing amount in the case of a bank transaction, are rendered into character strings and their contents are stored as character string data which can be electronically recognized. Then, in comparison with the conventional case where in response to a processing request by e.g. telephone an operator would hear the contents of the processing request and make a voucher thereof, even if there occurs a human intervention during the generation process of the character string data, by reprocessing the character string data and transmitting them to the processing requester as a confirmation message, it is possible to significantly improve the reliability in the operations subsequent to the processing.

In the above, preferably, the speech signal/character string converting means converts the second predetermined portion of the speech signals into the character string data by means of speech recognition. Then, the character string data will be generated automatically and there will occur no erroneous processing due to incorrect hearing by the operator. Moreover, the reliability may be improved and it becomes also possible to reduce the processing time and to prevent wrongdoing.

Further, according to the constructions of the present invention, in comparison with a case where the contents of communication with the processing requester are stored simply as audio signals, the data volume may be significantly compressed without losing required data amount. Further, as the data are digitized, they may be processed by the existing computer system, so that operations related to the processing request may be carried out faster. In addition, with the storage of the character string data and the digital speech data, it becomes unnecessary to permanently store a processing proof voucher which would conventionally be provided in the form of a printed paper slip. As a result, it becomes possible to store a large amount of processing request contents within a limited storage space.

Further, although it may be possible to transmit, from the processing requester, numerals 0–9 by means of dialing tones or dialing pulses of the telephone, it is technically difficult to cope with non-numeric characters and such telephone operations will not be easy for all potential users. Then, by converting the speech into character strings, it becomes possible to cope with non-numeric characters.

Also, of the contents of the processing request by means of speech, if speech signals of the name of the processing requester and of a confirmation message to the effect that the processing requester has confirmed and approved of the contents of the processing request are converted into digital speech signals, then, it becomes possible for an existing computer system to process the request, and feature extraction of the speech patterns of the name of the processing requester or of the confirmation message may be effected by means of a digital signal processing. Then, if the first predetermined portion includes speech to be used for identity verification, it becomes advantageously possible to use it in the identity verification of the processing requester. As a result, the provability of the confirmation message may be enhanced advantageously.

Further, as the processing request distinguishing ability is added to the character string data and the digital speech data, these data may be readily searched as being distinct from those relating to other processing requests. Moreover, even though the respective data are stored in the condition separated from each other, they may be maintained in a virtually correlated state. Then, the character string data needed for the business transaction and the digital speech signals effective for identity verification or as proof may be retrieved any time or as one depending on the necessity (displayed on a same screen or outputted as a print). Then, the processing operations may be carried out with greater speed and higher reliability. Moreover, data processing according to the kind of processing request or a search for a past processing request may be carried out very easily. So that, such information may be utilized for management of tendency in processing requests or client search activity.

Further, preferably, the processing request receiving apparatus according to the invention further comprises speech waveform generating means for generating speech signal waveform data from all or a portion of the digital speech data; and outputting means capable of outputting a required portion of the character string data and at least the speed signal waveform data of the digital speech data relating to one common processing request by means of an image display or print output in a predetermined format.

Preferably, the processing request receiving method according to the present invention further comprises:

after completion of the storing step, executing a speech waveform generating step of generating speech signal waveform data from all or a portion of the digital speech data; and executing an outputting step of outputting a required portion of the character string data and at least the speed signal waveform data of the digital speech data relating to one common processing request by means of an image display or print output in a predetermined format.

With the above, in the case of the provision of the print output function, in making a processing request voucher based on the processing request contents, as a substitute for a signature or a signature stamp, a waveform pattern or characteristic portion of the processing requester's voice may be obtained from the digital speech signals and printed at predetermined portions of the processing request voucher. Then, a processing request voucher which does not appear significantly different from the existing vouchers may be produced. Also, this processing request voucher may be used in an assessment department of the requestee or as a copy for the processing requester.

Moreover, based on the character string data, a processing request voucher in which required items such as a transaction item, the name of the processing requester or titular proprietor, a name or serial number of the branch, an account name, and a processing amount are printed may be automatically produced. In this case, as these data are converted in advance into the character strings, the operation of producing the processing request voucher may be effected at high speed because of no necessity of effecting further a data converting operation or the like.

Further, in case the image display function is provided, like the above-described case of the provision of the print output function, a processing request voucher which does not appear significantly differ from the existing processing request vouchers may be produced on the display screen. Hence, an on-line voucher processing and data search in the format of the processing request voucher too become possible. Further, if this function is combined with the print output function, it is possible to check the contents of the processing request voucher before its print output.

Preferably, the processing request receiving apparatus according to the present invention further comprises: automatic speech responding means for responding to the processing request by transmitting a response message according to the contents of the processing request; and said storing means also stores response message character string data comprised of character strings converted from said response message or a response message identification code allowing identification of the response message and the character string data corresponding to said response message in a mutually separated or connected state, in addition to time data for allowing identification of time/date of the transmission of the response message or time/date of the receipt of the conversation on which the character string data are based.

And, in the processing request receiving method according to the invention, preferably, a plurality of response message transmitting steps for transmitting, one after another in a predetermined order, a plurality of response messages according to the contents of the processing request at the time of receipt thereof and a plurality of said receiving steps are executed alternately; and in said storing step, when storing the character string data corresponding to the response message, the response message converted into character strings or the response message identification code allowing identification of the response message and time data allowing identification of time/date of the transmission of the response message or time/date of the receipt of the conversation on which the character string data are based, are stored in a mutually separated or connected state in addition to said character string data.

With the above, for the processing request contents from the processing requester by speech, the requestee may obtain the data to be processed and stored without any excess or shortage. And, by correlating items of questions from the operator with the contents of responses thereto and by adding the time data thereto, it may be ensured that the processing request contents are from one series of processing request.

Further, preferably, the storing means comprises a write-once non-rewritable file memory.

With the above, it becomes extremely difficult to alter for the purpose of defraudation the data base of the processing request contents once stored in the storing means. So that, the reliability of the data base may be maintained high and for a long period of time as well.

As described above, according to the present invention, when a processing request is received in the form of speech, it is possible to construct a data base of the processing request contents and agreement contents which can be readily handled and can be readily accessed from an existing computer system. Further, from this data base, a voucher relating to the processing request contents and having substantially same functions as a conventional voucher may be produced.

BRIEF DESCRIPTION OF THE DRAWINGS

FIG. 1 is a system construction view showing one embodiment of a processing request receiving apparatus relating to the present invention.

BEST MODES OF EMBODYING THE INVENTION

Figure 2:
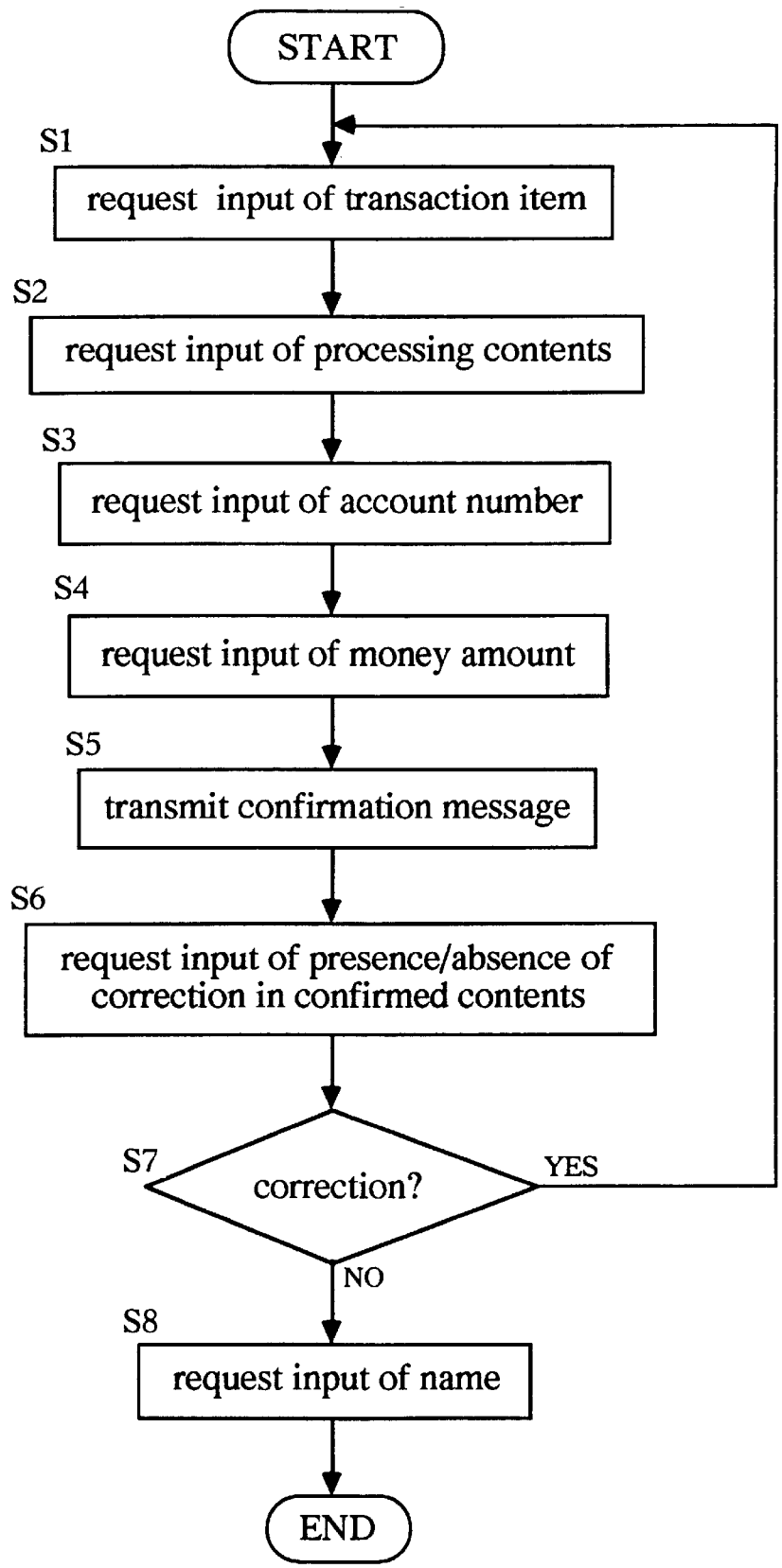
FIG. 2 is a flow chart illustrating a responding procedure by the processing request receiving apparatus and method relating to the present invention.

FIG. 1 is a system construction view showing a construction of a voice processing request receiving apparatus (to be referred to as the invention's apparatus 1 hereinafter) according to one embodiment of the present invention, in relation with its peripherals.

As shown in FIG. 1, a processing requester 5 as a client and a reception center 4 for collectively receiving various processing requests for e.g. a bank transaction or a commodity purchase from this processing requester 5 are connected with each other via a public telephone network 6.

The reception center 4 includes the invention's apparatus 1, a PBX 2, an operator terminal 3 and a gateway 7.

Further, the invention's apparatus 1 includes a speech signal quantizing means 11, a speech signal/character string converting means 12, a write-once non-rewritable file memory 13a which is a storage means 13, a speech waveform generating means 14, a voucher making means 15a as one output means 15, an automatic speech responding means 16, a time data generating means 17, a computer terminal 18 having a display unit as another output means 15, a speech signal transmitter receiver 19, a signal bus 20, a central processing unit 21 and a sound recording means 22.

Incidentally, the signal bus 20 is connected on-line via the gateway 7 to a network 8 of another computer system, and the network 8 is connected to another computer terminal 9 and so on.

The speech signal transmitter receiver 19 receives voice-band analog telephone signals inputted through the PBX 2 and transmits them to the speech signal/character string converting means 12. The transmitter receiver 19 also receives a response message generated from the automatic speech responding means 16 in the form of voice-band analog telephone signals and transmits them to a telephone of the processing requester 5 via the public telephone network 6.

The speech signal quantizing means 11 converts the voice-band analog telephone signals received from the speech signal transmitter receiver 19 into digital speech data quantized and pulse-code modulated at an appropriate sampling frequency. These converted digital speech data are temporality stored in a temporary storage unit incorporated therein.

The speech signal/character string converting means 12 first effects digital/analog conversion of the voice-band analog telephone signals received from the speech signal transmitter receiver 19 and then effects speech recognition on them by a digital signal processor incorporated therein to convert them into character string data of alphanumerics, Kana characters, Chinese characters, marks and so on. The actual character string data are encoded into binary codes, which are recognized as the actual character strings when printed in a voucher format shown in FIG. 3 by the voucher making means 15a or displayed on the display unit of the computer terminal 18.

The automatic speech responding means 16 selects from responding messages synthesized for respective processing requests in an order predetermined according to the contents of the processing request and transmits them to the speech signal transmitter receiver 18.

The file memory 13a stores therein the character string data and the digital speech data relating to a plurality of kinds of processing requests with those relating to one common request being distinguishable from others relating to other requests.

Specifically, the character string data and the digital speech data for each processing request may be stored as separate files within a common directory, with the respective files being assigned with file names sharing a unique common portion. Or, all of the character string data and the digital speech data are combined as a single file in a predetermined file format, with a unique file name being assigned for each processing request.

Incidentally, as the file memory 13a, a write-once non-rewritable optical disc is employed.

The time data generating means 17 incorporates a clock and transmits, when needed, time data such as the year, month and day and hour, minute and second in the form of binary-coded digital signals to the speech signal quantizing means 11, the speech signal/character string converting means 12, and the automatic speech responding means 16. Before transmitting the data to the speech signal transmitter receiver 19, the time data generating means 17 effects a scrambling according to a predetermined algorithm on the binary-coded digital signals and then converts them into voice-band signals having a predetermined spectrum pattern which can be superimposed on voice-band telephone signals and which also can be separated later from the superimposed voice-band telephone signals.

The speech waveform generating means 14 reads the digital speech data from the file memory 13a, synthesizes therefrom a characteristic waveform (e.g. voiceprint) of the speech of the processing requester 5 relating to the particular processing request and then transmits still-image data of this waveform to the voucher making means 15a or to the computer terminal 18 via the signal bus 20.

In response to a voucher making request inputted from the computer terminal 18, the voucher making means 15a reads the character string data relating to the particular processing request from the file memory 13a, reproduces the characteristic waveform of the speech of the processing requester 5 from a predetermined portion of the character string data and the still-image data and prints it on a voucher slip 30 of a predetermined size in a predetermined format.

The computer terminal 18 is an I/O device which allows visual preview confirmation of the voucher made by the voucher making means 15a before its print out and allows inputs of necessary data to the voucher making means 15a. Incidentally, the computer terminal 18 may be utilized also for search of the data stored in the file memory 13a.

The speech signal quantizing means 11, the speech signal/character string converting means 12, the automatic speech responding means 16 and the speech signal transmitter receiver 19 respectively have a plurality of channels so as to be able to cope with a plurality of processing requests simultaneously. The central processing unit 21 controls and manages the operations for each processing request of the speech signal quantizing means 11, the speech signal/character string converting means 12, the file memory 13a, the automatic speech responding means 16, the speech signal transmitter receiver 19 and the time data generating means 17.

The CPU 21 also makes in the file memory 13a a file area or a directory area uniquely assigned for each processing request and reads the digital speech data and the character string data temporarily stored respectively in the temporary storing units of the speech signal quantizing means 11 and the speech signal/character string converting means 12. The CPU 21 then reconstructs these data as either one combined file or separate files and stores them in the file area or the directory area in the predetermined format and effects file management of the digital speech data and character string data after the storage thereof.

Further, the CPU 21 classifies all of the speech inputs from the processing requester 5 into a first predetermined portion or a first conversation content class needed e.g. for requester's identity verification or agreement by the processing requester 5 on the processing contents, a second predetermined portion or a second conversation content class needed for making the voucher, a further class belonging in both of the two classes or a still further class belonging in neither of the two classes. And, the CPU 21 controls the speech signal quantizing means 11 and the speech signal/character string converting means 12 so that the speech signal quantizing means 11 is selected for a speech input belonging in the first predetermined portion or the first conversation content class, the speech signal/character string converting means 12 is selected for a speech input belonging in the second predetermined portion or the second conversation content class and both the speech signal quantizing means 11 and the speech signal/character string converting means 12 are selected for a speech input belonging in both the classes.

Specifically, in the case of e.g. one transaction mode of a bank transaction, according to a procedure illustrated in FIG. 2, to the processing requester 5, the automatic speech responding means 16 effects, in a questionnaire format, various input requests S1–S4, S6 and S8 and a confirmation message transmission S5 for confirmation of the processing contents. In the input request Si relating to the transaction item, the transaction kind such as ordinary deposit, time deposit or the like is asked and an answer thereto from the processing requester 5 is awaited. After confirmation of the answer from the processing requester 5, in the input request S2 relating to the processing contents, the contents of the processing such as continuation of time deposit, money transfer from a time deposit to an ordinary deposit or the like is asked and an answer thereto from the processing requester 5 is awaited. Likewise, in the account number input request S3 and the money amount input request S4, the account number and the money amount to be processed are asked, respectively.

Figure 3:
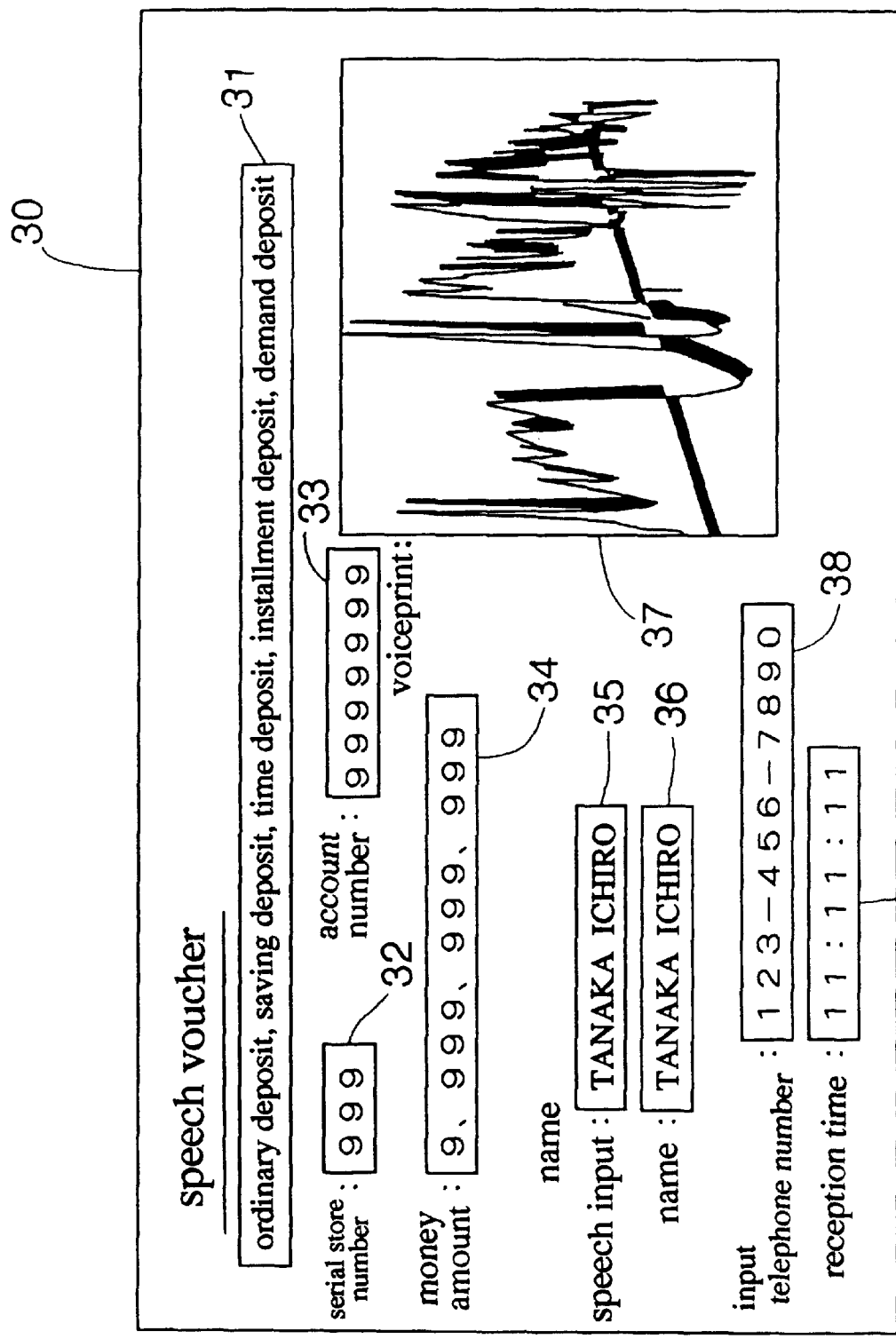
FIG. 3 is a descriptive view showing a voucher format relating to the present invention.

After completion of the necessary inputs, in the confirmation message transmission S5 for confirmation of the processing contents, a confirmation message is transmitted to allow the processing requester 5 to confirm the processing contents. In succession, the input request S6 concerning presence/absence of correction in the confirmed contents, necessity or unnecessity for correction is asked for the processing contents in the confirmation message. At S7, presence/absence of correction is determined from the answer from the processing requester 5. In the case of presence of correction, the process returns to the transaction item input request S1 and the same procedure as above is repeatedly carried out. In the case of absence of correction, the process goes to the name input request S8 to ask the name of the processing requester 5. After confirmation of the input of the name, the entire procedure for the processing requester 5 is completed. Incidentally, in this input confirmation, the identity verification by means of the speech input of the name is carried out and the voucher shown in FIG. 3 is made.

In the above, the respective answers from the processing requester 6 to the input requests S1–S4 and S6 are converted into the character string data by the speech signal/character string converting means 12; and these character string data corresponding to the answers to the input requests S1–S4 are transmitted to the automatic speech responding means 16, which in turn recognizes the contents of the data and synthesizes the confirmation messages. The answer to the input request S6, i.e. 'YES' or 'NO', is converted at S7 into character string data which can be recognized by the CPU 21. Further, an input request by means of dialing tones of numerals or combinations of a numeral and a character adapted in advance to correspond to the possible answer 'YES' or 'NO' may be provided in replacement of or in addition to the speech input request at S7 for requesting 'YES' or 'NO' from the processing requester 5. In this case, it is preferred that the speech signal/character string converting means 12 be provided with an additional function of directly recognizing the dial tones and generating the character string data therefrom.

The confirmation message, the input request S6 and its answer, and the name of the processing requester 5 which is the answer to the input request S8 are converted respectively into the digital speech data by the speech signal quantizing means 11. With this digital recording of the confirmation message, the input request S6 and its answer as one set, the effect of improvement of provability of the processing content record per se may be expected.

The character string data and the digital speech data are stored step-by-step basis at each of the respective input request steps and subsequent receiving steps or stored in batch after completion of all the steps.

FIG. 3 illustrates an example of the format of the voucher made by the voucher making means 15 in the case of the bank transaction shown in FIG. 2.

As shown in FIG. 3, the voucher slip 30 is printed in advance with predetermined characters and figures. On this voucher slip 30, the character string data are printed in respective frames 31–35 and further the characteristic speech waveform of the speech of the processing requester 5 synthesized from the digital speech data of the name of the processing requester 5 is printed within a frame 37. Further, the voucher making means 15a reads the reception time data generated by the time generating means 17 from the predetermined area of the file memory 13a in which the data were stored and then prints the data within a frame 39. Further, from the client data base, the name in the Chinese characters and the telephone number of the processing requester 5 registered therein are retrieved and printed within a frame 36 and a frame 38, respectively.

Next, other embodiments will be described.

<1> In the foregoing embodiment, the speech signal/character string converting means 12 automatically generates the character string data by means of the speech recognition. Instead, in case e.g. precision of the speech recognition is low depending on the condition of the speech signals to be recognized, a human operator may manually correct the automatically generated character string data from the operator terminal 3; or without effecting any automatic speech recognition, the operator may manually convert the contents acquired by ear into character string data by means of a key input operation. With such human intervention, by employing the above-described system in which the confirmation message is generated based on the contents which were once converted into character string data to be confirmed by the processing requester, it is still possible to prevent erroneous operations by the operator or fraudulent manipulation of the data. Such confirmation system as this may effectively function also in case the character string data are automatically generated, thus serving to prevent erroneous operator operations or fraudulent manipulation of the data.

<2> In the procedure of the foregoing embodiment illustrated in FIG. 2, in addition to the various input requests S1–S4, S6 and S8, if necessary, input requests for inputs of a registered membership number or a password by means of telephone dial tones may be added. In this case, it is preferred that the speech signal/character string converting means 12 be provided with the additional function of directly recognizing these dial tones and generating the character string data therefrom.

<3> In FIG. 1, the automatic speech responding means 16 generates the response message. Alternatively, a human operator may respond from the operator terminal 3.

The response message generated by the automatic speech responding means 16 or the human operator may be converted into response character strings, so that these data may be stored in the storage means 13 together with the character string data and the digital speech data generated from the speech input from the processing requester 5. In this case, to each of the response character string data, the character string data and the digital speech data, the time data generated by the time data generating means 17 may be added. With this, the generating order and correlations among the data will become more clear.

Incidentally, of the response messages, the preset response messages can be converted in advance into character strings, rather than converted each time by the speech signal/character string converting means 12. Then, these response character string data may be stored in advance in the non-volatile storage unit within the automatic speech responding means 16, so that these data may be read therefrom when needed. Further, it is also preferred that instead of the response character string data which were converted into the character strings in advance, response message identification codes capable of identifying the response character string data be stored within the storage unit 13 together with the character string data and the digital speech data.

<4> Of the speech inputs from the processing requester 5 to the response messages, those consisting solely of numerals such as a money amount, may be received in the form of analog signal inputs as dialing tones or dialing pulses from the telephone of the processing requester 5, instead of the speech inputs. And, the speech signal/character string converting means 12 may be adapted to be capable of automatically converting the analog signal inputs into a string of numerals.

<5> The file memory 13a may be constructed of an OTPROM (one time programmable read only memory) which is a semiconductor memory, rather than the optical disc.

The storage means 13 may be constructed of a temporary storage unit allowing rewriting and high-speed access and the file memory 13a. In this case, the data transfer speed between the storage means 13 and the speech signal quantizing means 11 or the speech signal/character string converting means 12 increases, so that improvement in the efficiency in processing a plurality of processing requests may be expected.

<6> In the invention's apparatus shown in FIG. 1, the apparatus is managed collectively by the CPU. Alternatively, the speech signal quantizing means 11, the speech signal/character string converting means, the automatic speech responding means 16 and the time data generating means 17 may be provided respectively with an automatic control unit of its own, so as to allow a parallel distributed management. Further, it is also preferred that the speech signal quantizing means 11 be adapted to be utilized in the digital/analog conversion of the speech signal/character string converting means 12.

As shown in FIG. 1, an existing sound recording means 21 may be provided for recording the processing contents in the analog as a backup to be stored for a predetermined period of time.

Further, another computer network may be provded within the reception center 4 to be on-line connected via the signal bus 20 and a network connector such as a gateway. It is also preferred that a plurality of the invention's apparatuses 1 be provided within the reception center 4 with the respective signal buses 20 thereof being on-connected with each other via a network connector such as a gateway.

<7> The mode of embodying the invention is not limited to the bank transaction illustrated in FIGS. 2 and 3. The invention may be applied also to processing of a loan application as another mode of a bank transaction or processing of request for other financial transaction or commodity purchase and so on.

<8> For instance, when the invention is applied to the processing of a loan application, in the input requests S1–S4 shown in FIG. 2, instead of the input requests shown in FIG. 2, items needed for the processing of the loan application, for instance, a loan amount, a family make-up, an income, the purpose of the fund, will be asked and respective answers thereto from the processing requester by speech or by speech input in combination with dial input will be awaited. Thereafter, the process will follow the procedure illustrated in FIG. 2 for confirmation of the processing contents and the requester's identify verification, to complete the communication with the processing requester. Then, a loan application form will be made in the same manner as the voucher shown in FIG. 3. This is another preferred mode of embodying the invention.

What is claimed is:

1. A method of processing various processing requests by speech such as by telephone for a transaction, which comprises the steps of:

receiving the processing request from a processing requester;

then, executing a data storage area making step for making a processing request data storage area in a predetermined region of a storing means with the processing request being distinguishable from other processing requests;

executing receiving steps of receiving the contents of conversation of the processing requester with dividing the contents into predetermined content portions;

executing a speech signal quantizing step for quantizing speech signals of the conversation contents, thus converting them into digital speech data if the conversation contents received at each said receiving step belongs within a predetermined first conversation content class;

executing a speech signal character string converting step for generating character string data of speech data based on the speech data of the conversation contents if the conversation content belongs within a predetermined second conversation content class; and for all of the divided conversation content portions, executing a storing step of storing the digital speech data or the character string data in the data storage area either separately upon completion of said each speech signal quantizing step or said each speech signal/character string converting step or in batch upon completion of all of the speech signal quantizing steps and the speech signal/character string data converting steps.

2. The processing request receiving method according to claim 1, in said speech signal/character string converting step, the speech signals of the conversation content belonging within said second conversation content class are converted into the character string data by means of speech recognition.

3. The processing request receiving method according to claim 1, wherein said first conversation class includes speech to be used for requester's identity verification.

4. The processing request receiving method according to claim 1, further comprises:

after completion of the storing step, executing a speech waveform generating step of generating speech signal waveform data from all or a portion of the digital speech data; and executing an outputting step of outputting a required portion of the character string data and at least the speed signal waveform data of the digital speech data relating to one common processing request by means of an image display or print output in a predetermined format.

5. The processing request receiving method according to claim 1, wherein a plurality of response message transmitting steps for transmitting, one after another in a predetermined order, a plurality of response messages according to the contents of the processing request at the time of receipt thereof and a plurality of said receiving steps are executed alternately; and in said storing step, when storing the character string data corresponding to the response message, the response message converted into character strings or the response message identification code allowing identification of the response message and time data allowing identification of time/date of the transmission of the response message or time/date of the receipt of the conversation on which the character string data are based, are stored in a mutually separated or connected state in addition to said character string data.

* * * * *